United States Patent
Kostur

[15] 3,704,974
[45] Dec. 5, 1972

[54] MOLDING MACHINE
[72] Inventor: Robert E. Kostur, Oak Brook, Ill.
[73] Assignee: Comet Industries, Inc., Bensenville, Ill.
[22] Filed: April 20, 1970
[21] Appl. No.: 29,901

[52] U.S. Cl. .................... 425/214, 72/449, 74/29, 74/661, 74/665 M, 100/264, 425/412, 425/405, 425/388
[51] Int. Cl. ........ B29c 3/02, B30b 15/06, B30b 15/10
[58] Field of Search ........... 18/19 F, 19 P, 19 R, 16.5, 18/16 C, 16 P, 16 R, 16 T, 17 E, 30 LM, 30 LA, 30 LC, 30 LD; 72/446, 449, 454, 455, 453; 100/256, 257, 258 A, 258 R, 264, 295, 296; 74/29, 33, 661, 665 M; 25/27, 28, 54–56, 90, 91, 41 E, 41 A

[56] References Cited

UNITED STATES PATENTS

| | | | |
|---|---|---|---|
| R25,484 | 11/1963 | Kostur | 18/19 P |
| 3,494,167 | 2/1970 | Eibe | 74/661 X |
| 3,348,406 | 10/1967 | Holberson | 100/257 X |
| 3,315,860 | 4/1967 | Adams et al. | 74/661 X |
| 1,923,225 | 8/1933 | Moorhouse | 74/661 X |
| 2,884,885 | 5/1959 | Bannon | 100/256 X |
| 2,924,077 | 2/1960 | Tourneau | 74/661 X |
| 3,433,290 | 3/1969 | Eggenberger et al. | 18/30 LV X |
| 2,961,730 | 11/1960 | Marino | 25/41 E |
| 2,934,968 | 5/1960 | Neumann et al. | 72/453 X |

*Primary Examiner*—H. A. Kilby, Jr.
*Attorney*—Fidler, Ratnaude, Lazo & Batz

[57] ABSTRACT

The four pinions that are mounted to a platen and engage four vertical racks in the molding station to position the platen of a molding machine vertically are driven by two motors with each motor driving a shaft that is connected at one end to a speed reducer with which it drives one pinion and is connected at its other end to a transverse shaft through a bevel gear, the transverse shaft being connected to another speed reducer by which the second pinion is driven. With two motors driving high rpm shafts that extend close to the four pinions, the platen has a better weight distribution, greater efficiency, greater torque at the pinions, more accurate positioning, more accurate braking and a longer stroke.

2 Claims, 4 Drawing Figures

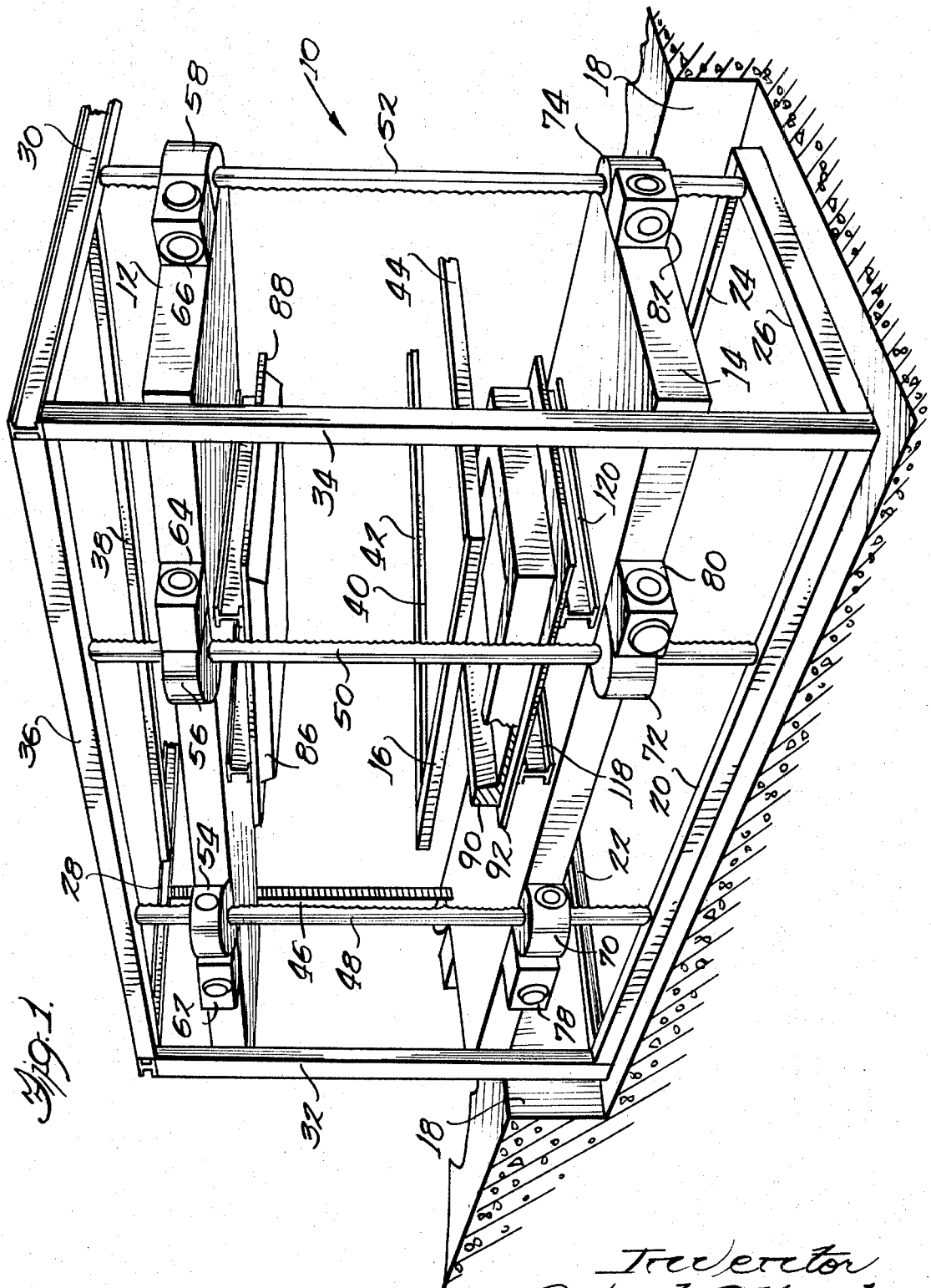

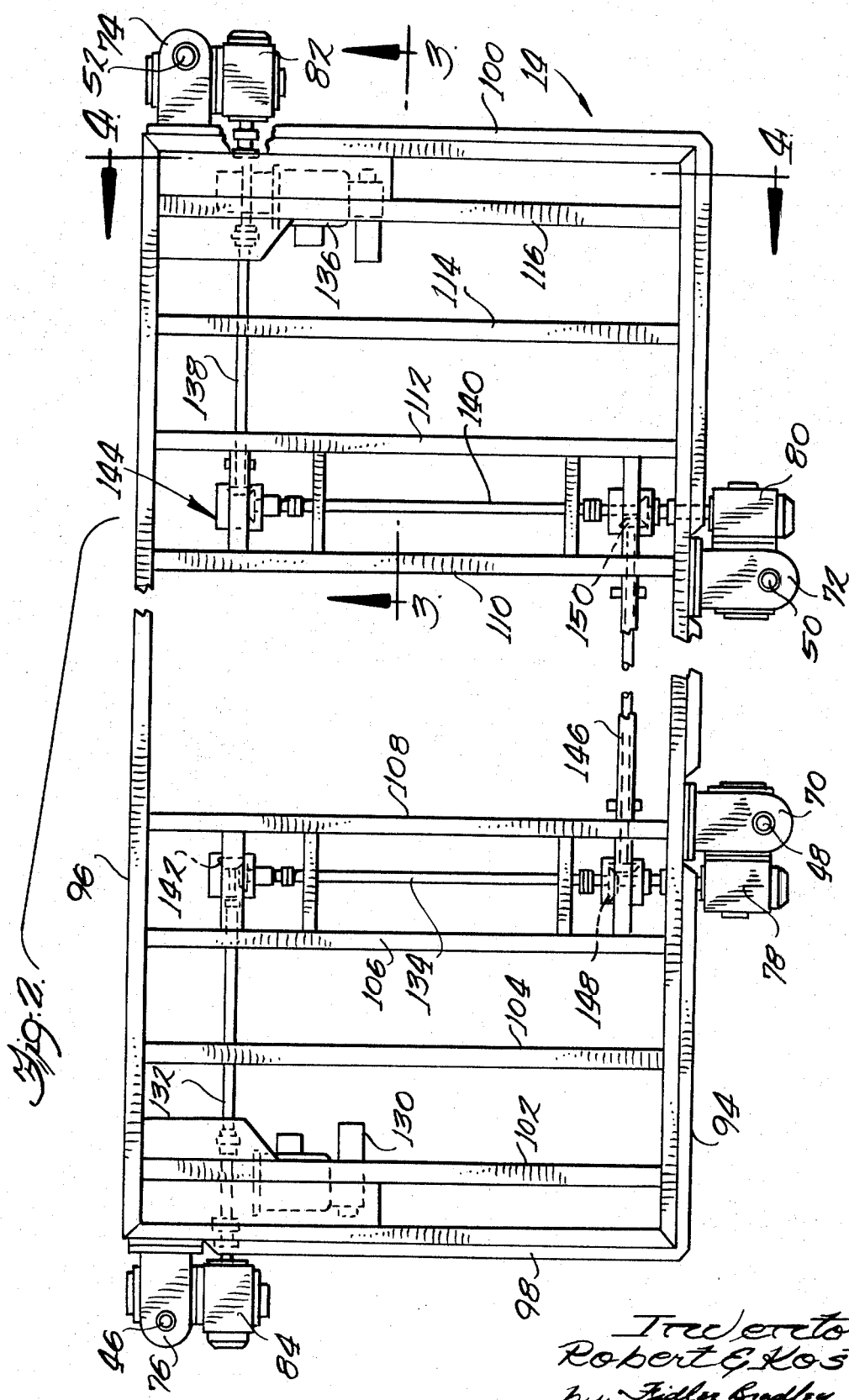

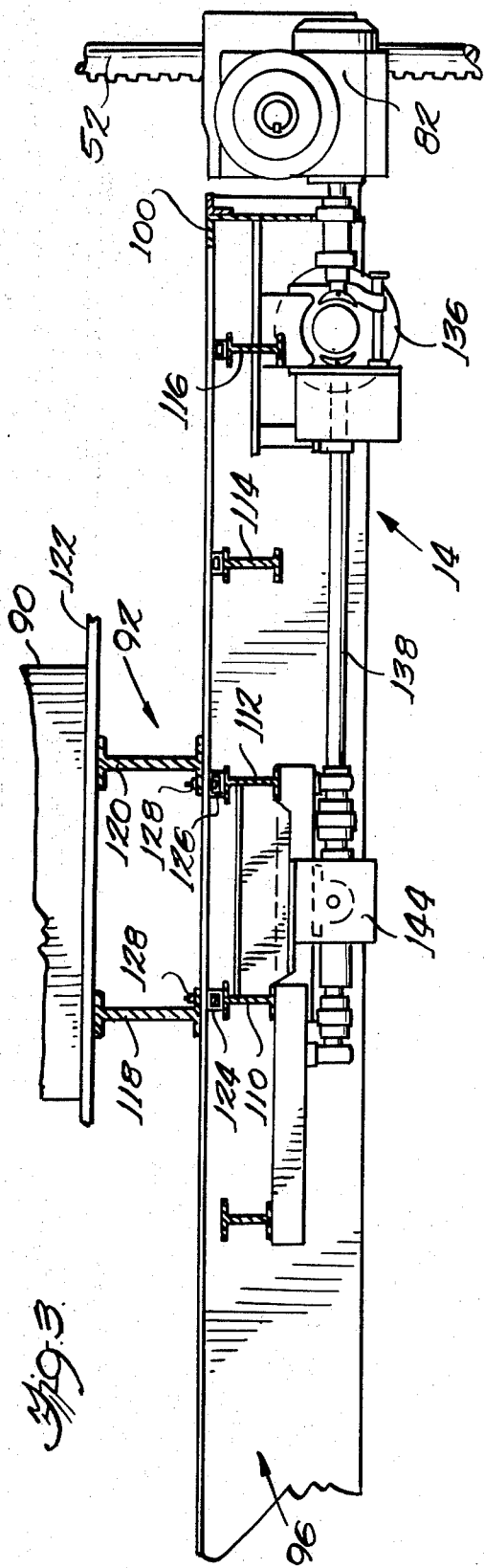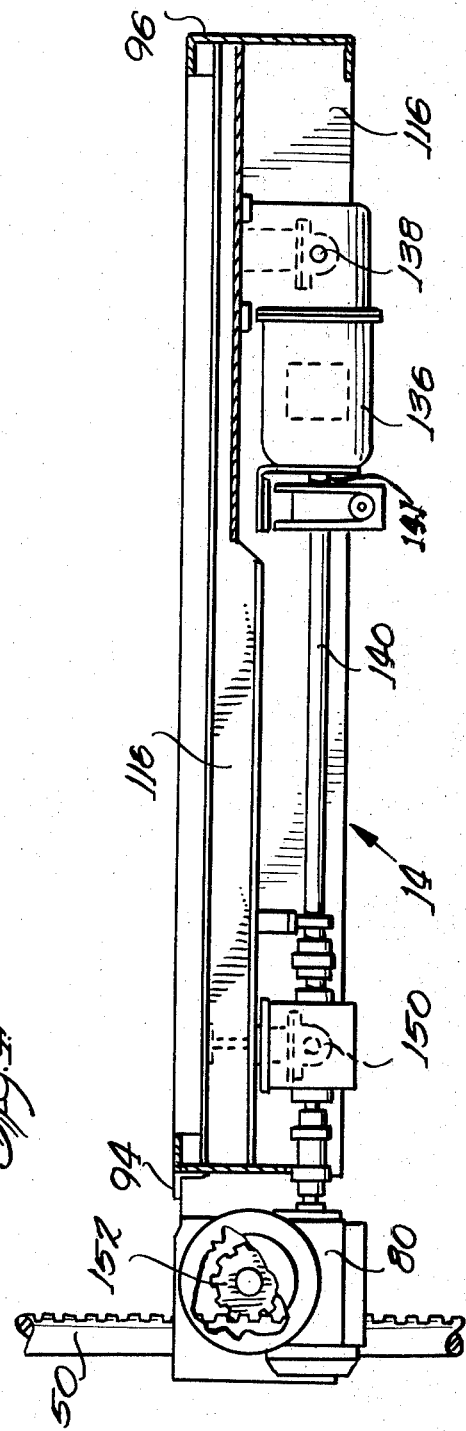

MOLDING MACHINE

This invention relates to thermoforming machines for molding plastic sheets and more particularly relates to the drive mechanism for moving the platens of such thermoforming machines.

In one type of molding machine, there is a molding station that receives a horizontally positioned heated sheet of plastic to be molded. Movable platens with dies mounted to them are positioned above and below the sheet of plastic. They move the dies against the sheet of plastic in the molding operation and away from the sheet of plastic at other times such as when a new sheet of plastic is being positioned in the molding station. The platens are driven by pinions mounted on the platens and engaging vertical racks so that the pinions lift a platen upwardly when they rotate in one direction and move it downwardly when they rotate in the opposite direction. Motors are mounted on the platens to drive the pinions.

In the prior art thermoforming machines of this type, a single motor is mounted on a single platen adjacent to a speed reducing mechanism. The motor drives the speed reducing mechanism and the speed reducing mechanism drives shafts to rotate each of the several pinions positioned around the circumference of the platen.

The prior art molding machines are satisfactory but there are several features that persons skilled in the art wish to improve. One such feature is the weight distribution on the platen. Another feature is the weight of the apparatus necessary to drive the platen. Still another feature is the precision with which the platen can be positioned and the amount of free play or tolerance in the platen once it has been positioned. Still another feature is the distance the platen can be moved laterally before the motor touches the roof of the molding station or its floor.

Accordingly, it is an object of this invention to provide a novel thermoforming apparatus.

It is a further object of this invention to provide a novel drive apparatus for the platens of a thermoforming machine.

It is a still further object of this invention to provide a platen for a thermoforming machine which has good weight distribution.

It is a still further object of this invention to provide a drive apparatus for a thermoforming machine which has high efficiency.

It is a still further object of this invention to provide a drive apparatus for a thermoforming machine which is light in weight.

It is a still further object of this invention to provide a platen for a thermoforming machine which may be precisely positioned in the molding station.

It is a still further object of this invention to provide a platen which has little tolerance or free play once it is properly positioned.

It is a still further object of this invention to provide a molding machine in which the platens holding the dies have a long stroke.

In accordance with the above and further objects of the invention a platen for a thermoforming machine is provided with two electrical motors mounted thereto for driving the platen in a vertical direction. Each motor drives two separate pinions which engage vertically positioned racks around the circumference of the platen to move the platen upwardly or downwardly as the pinions turn.

To rotate the two pinions, each motor rotates a different shaft, one end of which drives a first speed reducing mechanism that is directly connected to a first pinion assembly and the other end of which drives, through a bevel gear, a second shaft transverse to the first shaft, with the other end of the transverse shaft driving a second speed reducing mechanism adjacent to the second pinion.

Because two motors are used rather than one motor, there is a better weight distribution on the platen and the two platens in a molding station and the motors do not project as far from the platen hence permitting a longer stroke before a motor touches the floor or ceiling.

Because the speed reducing units are mounted adjacent to the pinions, the shafts on the platens rotate at a higher speed than in the prior art apparatus as for the same amount of vertical motion of the platen. With this mechanization, the shafts carry reduced torque at a higher rate of revolution and provide the maximum torque at the pinions. The shafts may be smaller in size because of the reduced torque and they therefore have less weight. The reduced weight and reduced friction from the shaft increases the efficiency of the drive mechanism for the platen.

Because there is only a slight motion of the platen for many revolutions of the shafts, the platens may be more precisely positioned when the shafts are stopped. The error in the amount of rotation of the shaft in stopping is translated into a very slight amount of motion so that the platen is precisely positioned. For the same reason, there is less slack or tolerance in the motion of the platen when the drive apparatus has been locked in place by a brake that is located in or near the motor.

The above and further features of the invention will be better understood from the following detailed description when considered with reference to the accompanying drawings in which:

FIG. 1 is a fragmentary perspective view of a molding station incorporating an embodiment of the invention;

FIG. 2 is a simplified plan view of a platen and drive assembly;

FIG. 3 is a sectional view of the platen and drive assembly taken along lines 3 — 3 of FIG. 2; and FIG. 4 is a sectional view of a platen and drive assembly taken along lines 4 — 4 of FIG. 2.

THE MOLDING STATION

In FIG. 1 a simplified fragmentary perspective view of a molding station 10 is shown having an upper movable platen 12 and a lower movable platen 14 positioned on either side of a movable sheet carrying frame 16 all of which are within the framework of the molding station 10.

The molding station 10 rests within a recess 18 within the floor to extend to a lower level than the remainder of the molding machine (not shown). Four base bars 20, 22, 24, and 26 together forming a rectangular base at the bottom of the recess 18 to support the molding station 10. Two parallel I beams 28 and 30 extend from the opposite end of the molding machine from the molding station 10 to the outer edge of the molding machine where they are each supported by a different one of two parallel upright tubular supports 32 and 34 respectively, which tubular supports extend from the base bars 20 – 26 in the recess 18 upwardly to the I beams 28 and 30. Two parallel trusses 36 and 38 extend between the I beams 28 and 30 to form an upper rectangular framework for the molding station 10, with the truss 36 being above and parallel to the outer base bar 20 and the truss 38 being above and parallel to the inner base bar 24.

To move sheets of plastic into the molding station 10 for thermoforming, the sheet carrying frame 16 is provided with clamping apparatus (not shown) that carries a sheet of plastic 40 within the molding station between the movable platens 12 and 14. The sheet carrying frame 16 is mounted by supports 42 and 44 to a rotary carrier (not shown) which moves a succession of four sheet carrying frames, with plastic sheets 40 through the molding station 10 for thermoforming with each revolution, having four circumferentially spaced carrying frames for this purpose. In other stations (not shown) of the molding machine: (1) the thermoformed article is removed from the sheet carrying frame 16; (2) a new unformed sheet 40 is added to the frame; and (3) the plastic sheet 40 is heated just before being moved into the molding station 10.

To move the upper and lower platens 12 and 14 toward the plastic sheet 60 to form the plastic sheet, a drive assembly is provided. The drive assembly includes four upright parallel racks 46, 48, 50, and 52, with the racks 48 and 50 extending between the base bar 20 and the truss 36, with rack 46 extending between the base bar 22 and the I beam 28, and with the rack 52 extending between the base bar 26 and the I beam 30.

The upper platen 12 and the lower platen 14 include the remainder of the drive assembly.

On the upper platen 12 are mounted four pinion assemblies 54, 56, 58, and 60, with three of the pinion assemblies being shown in FIG. 1 and all four being shown in FIG. 2. Each of the pinion assemblies includes a different pinion which engages one of the four racks 48, 50, 52, and 46 respectively to move the platen 12 vertically from position to position within the molding station 10. Each of the pinions is driven by a different one of four speed reducing assemblies 62, 64, 66, and 68, which are positioned adjacent to the pinion assemblies 54, 56, 58, and 60 respectively along the periphery of the upper platen 12. The speed reducers are driven by two motors such as are shown in FIG. 2 to cause the platen 12 to be moved from vertical position to vertical position along the racks 46 – 52.

The lower platen 14 also includes four pinion assemblies 70, 72, 74, and 76, with three of the pinion assemblies 70, 71, and 74 being shown in FIG. 1 and with all four pinion assemblies being shown in FIG. 2. Each of the pinion assemblies includes a different pinion engaging a different one of the four racks 48, 50, 52, and 56 respectively to move the platen 14 from vertical position to vertical position within the molding station 10. Each of the pinions is driven by a different one of four speed reducing assemblies 78, 80, 82, and 84, which speed reducing assemblies are positioned adjacent to the pinion assemblies 50, 56, 58, and 60 respectively. These speed reducers are driven by two motors mounted beneath the lower platen 14 to drive the platen 14 from vertical position to vertical position along the racks 46 – 52.

To mold the sheet of plastic 40 when the platens 12 and 14 are moved together, a die 86, shown as the plug assist type in FIG. 1, is attached to the upper platen 12 by its mounting base 88 and a die 90 is attached by its mounting base 92 to the lower platen 14. The die 90 is aligned with the die 86 and cooperates with it to mold the plastic sheet 40 when the upper and lower platens 12 and 14 are driven together within the molding station 10.

OPERATION OF THE MOLDING MACHINE

In operation, a plastic sheet 40 is attached to a sheet carrying frame 16 in a loading station (not shown). The sheet carrying frame 16 then moves to an oven station where it is heated while another plastic sheet is being attached to another sheet carrying frame 16 in the loading station positioned at the next of the four circumferential locations of the rotary carrier. When the plastic sheet 40 is sufficiently heated, it is moved into the molding station 10.

In the molding station 10, the lower platen 14 is moved upwardly adjacent to the plastic sheet 40 and pneumatic pressure is applied from the inside of the female die 90 to billow the plastic sheet 40 outwardly. Next a vacuum is applied in the cavity of the die 90 to pull the heated plastic sheet 40 downwardly and the upper platen 12 is driven down so that the plug 86 moves into the female die 90 to aid in the molding of the plastic sheet 40. The vacuum is then released and the upper and lower platens 12 and 14 move outwardly away from the sheet carrying frame 16. The sheet carrying frame 16 then moves out of the molding station 10 and a new sheet carrying frame 16 with a heated plastic sheet 40 moves into the molding station 10, the molded article being removed from the sheet carrying frame that has left the molding station so that a new sheet may be inserted for molding later.

In moving the upper and lower platens 12 and 14 from vertical position to vertical position within the molding station 10, the speed reducing assemblies 62, 64, 66, 68, 78, 80, 82, and 84 are driven by motors mounted to the platen. The speed reducing units, in turn, drive pinions in the pinion assemblies 54, 56, 58, 60, 70, 72, 74, and 76, which pinions engage with the racks 46, 48, 50, and 52 to move the platens 12 and 14. Each motor drives two separate speed reducers so that four motors, two on each platen, provide the primary driving force.

With the speed reducers mounted immediately adjacent to the pinions, the motors drive the speed reducers with shafts that rotate rapidly. With this arrangement, several advantages are provided, which are: (1) smaller sized motors are possible than in other arrangements in which a single large motor is mounted to each platen to drive a speed reducing assembly that drives each of the pinions attached to the platen; (2) the use of two motors with four speed reducers mounted along the periphery of the platen provides a better weight distribution on the platens; (3) this arrangement is more economical to manufacture; (4) maximum power is provided at the racks with the higher speed torque transmission from the motors; (5) there is locking action at the rack which does not provide as much tolerance or slack when the platens are stationary; (6) the platens may be positioned with greater precision; and (7) the molding station is more easily assembled.

STRUCTURE OF THE PLATEN

The bottom platen 14 is shown in FIGS. 2, 3, and 4. The top platen 12 will not be separately described since the inventive features, although included on both the bottom platen 14 and the top platen 12, are sufficiently similar to be fully understood from a description of only the bottom platen 14.

As best shown in FIG. 2, the bottom platen 14 includes the two elongated outer steel end plates 94 and 96 connected at their ends by the two parallel end plates 98 and 100 to form a rectangular frame. A plurality of I beams 102, 104, 106, 108, 110, 112, 114, and 116 extend between and are fastened to the end plates 94 and 96 to form a further supporting structure for the platen 14.

To mount the die 90 to the platen 14, the base 92 of the die 90 includes a plurality of longitudinally extending I beams 118 and 120 supporting a rectangular plywood plate 122, to which the die 90 is fastened. The I beams include a plurality of apertures through their lower flanges as best shown in FIG. 3. To fasten the I beams 118 and 120 of the base 92 to the lower platen 14, the I beams 110 and 112 in the lower platen 14 each have fastened to their upper ends a different one of its elongated rectangular channels 124 and 126 respectively, with each of the channels having inwardly turned upper lips defining a slot. T-bolts 128 are positioned with their heads within the channels 128 and their shanks extending upwardly through the slots in the channels and through the apertures in the flanges of the I beams 118 and 120 in which position they are held by nuts threaded onto the shanks of the T-bolts above the flanges of the I beams 118 and 120.

To provide the driving force to move the platen 14 within the molding station 10, a first motor 130 drives the speed reduces 84 and 78 with a shaft 132 which is directly connected to the speed reducer 84 and connected to the speed reducer 78 through another shaft 134 and a second motor 136 drives the speed reducers 82 and 80 with a shaft 138 that is directly connected to the speed reducer 82 and connected to the speed reducer 80 through another shaft 140. The shafts 132 and 134 are connected through the bevel gears 142 and the shafts 138 and 140 are connected through the bevel gears 144. To maintain the four speed reducers 84, 78, 80, and 82 in synchronism, a shaft 146 is connected at one end to the shaft 134 through bevel gears 148 and at its other end to the shaft 140 through bevel gears 150.

As best shown in FIG. 4, the speed reducer 80 drives a pinion assembly that includes the pinion 152 which engages the rack 50. Each of the four pinion assemblies 76, 70, 72, and 74 engages a different one of the racks so that, as they are driven, the platen 14 is moved from vertical position to vertical position within the molding station 10.

Each motor may apply the braking force to the shaft it drives when it stops or a separate external brake may be used such as is shown adjacent the motor 136 at 141 in FIG. 4.

OPERATION OF THE PLATEN

In operation, the platen 14 is first at a low position in the molding station and the die 90 is mounted to it. To mount the die 90 to the platen 14, T-bolts 128 are inserted into the apertures in the bottom flanges of the I beams 118 and 120 forming a portion of the base 92 of the die, with the T-bolts having their heads extending outwardly from the flanges and their shanks inserted through the apertures in a direction toward the die 90. The T-bolts are loosely fastened to the apertures my means of nuts threaded on their shank between the flanges of the I beams 118 and 120. The die is then positioned over the platen 40 as best shown in FIG. 3 with the head of the bolts within the channels 124 and 126 and the shanks of the bolts extending through the slots in the upper portion of the channels. The die 90 is then slid along the channels into a position aligned with the plug assist 80 as shown in FIG. 1 and the nuts are tightened upon the T-bolts to hold it firmly in place.

When a heated sheet of plastic 40 is held in place by the sheet carrying carriage 16 (FIG. 1), the platen 14 is moved upwardly to engage the sheet carrying frame 16. The motion is started upwardly by electrical energization of the motors 130 and 136 (FIG. 2) with the motor 130 driving the shaft 132 and with the motor 136 driving the shaft 138. The shaft 132 drives a pinion in the pinion assembly 76 with the speed reducing assembly 84 and also drives the transverse shaft 134 and hence drives a pinion in the pinion assembly 70 with the speed reducer 78. The shaft 38 drives a pinion in the pinion assembly 74 with the speed reducer 82 and drives the transverse shaft 140, and hence drives a pinion in a pinion assembly 72 with the speed reducer 80. The motors and the pinions are maintained in synchronism by the shaft 146 which is connected to the shafts 134 and 140 through the bevel gears 148 and 150.

As illustrated in FIG. 4, the pinions, one of which is shown at 152, engage the racks 46, 48, 60 and 52, one of which is shown at 50 in FIG. 4, to move the platen 14 upwardly as they rotate. The platen is moved upwardly by rotation of the motor in one direction and move downwardly after the plastic sheet 40 has been formed by a reversal of the polarity of energization of the field of the motors 130 and 136.

Because the speed reducing assemblies 84, 78, 72, and 82 are mounted adjacent to the pinion assemblies 76, 70, 72, and 74, the shafts 132, 134, 146, 140, and 138 are rotated at a relatively high speed by the motors 130 and 136. Because they are rotated at a high speed, their size is smaller since they do not have as great a torque applied to them, the higher torque being created in the speed reducer as it reduces the speed of rotation of the shafts. The reduction in size increases the economy and efficiency and decreases the weight of the apparatus. It provides a maximum power at the racks and a better torque distribution.

Since the shafts are rotated many times for each rotation of the pinion, the motors 130 and 136 exercise a greater control over the position of the platen. Since a full revolution of the motor only results in a partial revolution of the pinion that moves the platen, there is more tolerance in the time necessary to stop the motor to position it correctly because an extra revolution only results in a slight motion of the platen. Moreover, the braking of the platen occurs in the motor or near the motor and provides more accurate positioning and less free play or tolerance because the amount of tolerance is reduced in the speed reducers.

By using two high speed motors rather than one larger and one lower speed motor, the size of the motors are reduced so that the platen may be lowered further since the size of the motors limits the amount of downward motion of the platen 14 before the outer surfaces of the motor contact the floor of the recess 18. Moreover, the two motors and the high speed shafts provide a better weight distribution on the platen to reduce vibrations or skew movement that might cause irregularities in the molded article.

What is claimed is:

1. Thermoforming apparatus comprising,
   a large, heavy, rectangular platen including a rigid frame,
   a first electric motor mounted on said frame near one side thereof,
   a second electric motor mounted on said frame at a location remote from said first motor near the side opposite said one side,
   a plurality of vertical racks respectively disposed adjacent the sides of said frame,
   a plurality of pinion drive units mounted on the side edges of said frame in respective operative engagement with said racks,
   a plurality of speed reducing units respectively mounted on said side edges of said frame adjacent said pinion drive units and drivingly connected to said pinion drive units,
   a first set of shafts connecting said first motor to two of said speed reducing units,
   a second set of shafts connecting said second motor to a different two of said speed reducing units, and
   a synchronizing shaft connected between said first and second sets,
   said motors being respectively disposed in proximity to two of said speed reducing units, and
   first and second brake means respectively connected to the output shafts of said motors.

2. Thermoforming apparatus according to claim 1 wherein
   said synchronizing shaft is connected to said first and second sets of shafts at locations adjacent the two of said speed reducing units most remote from said motors.

* * * * *